INVENTORS
Carl N. Frink
George H. Kenyon
BY John C. Kerr
ATTORNEY

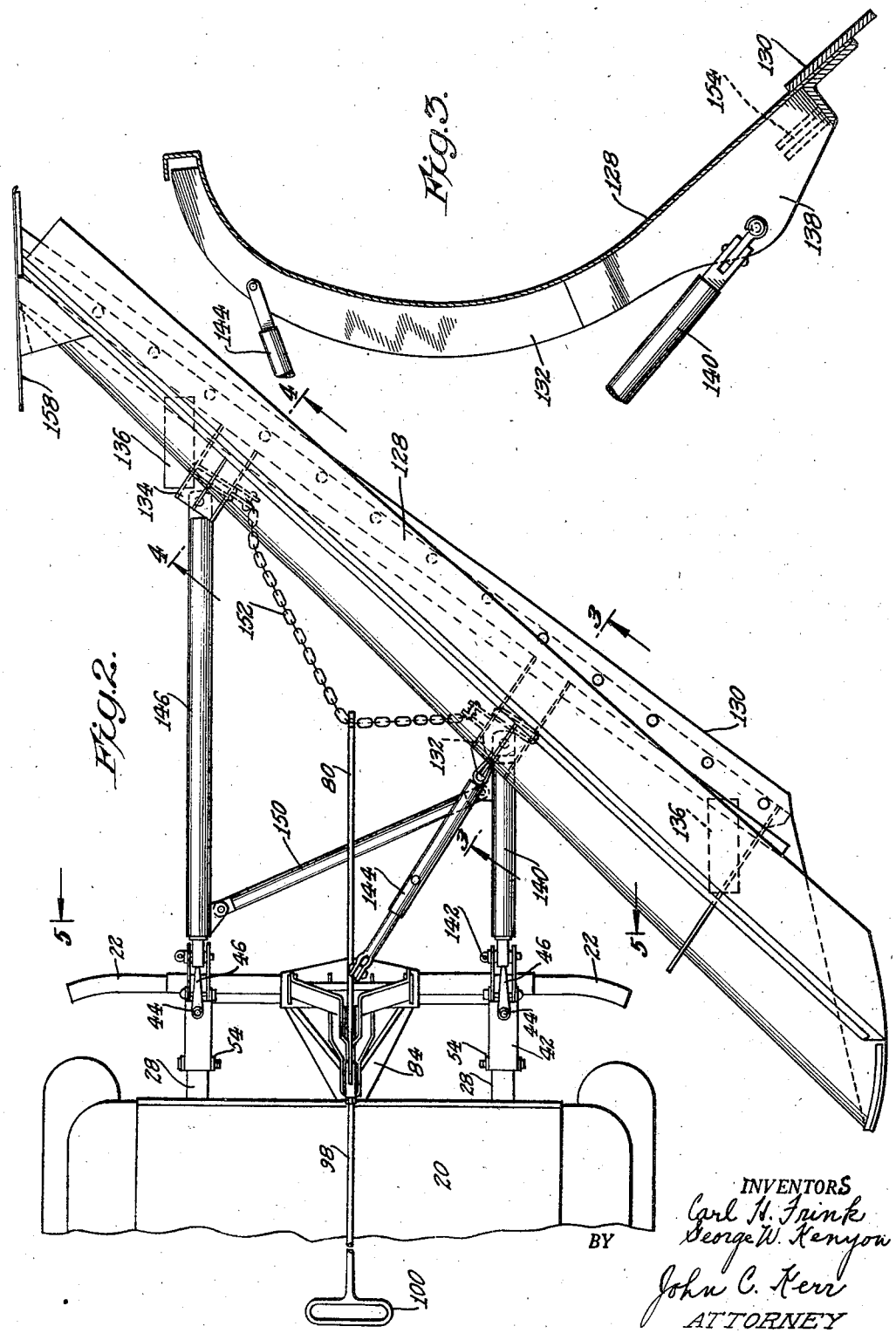

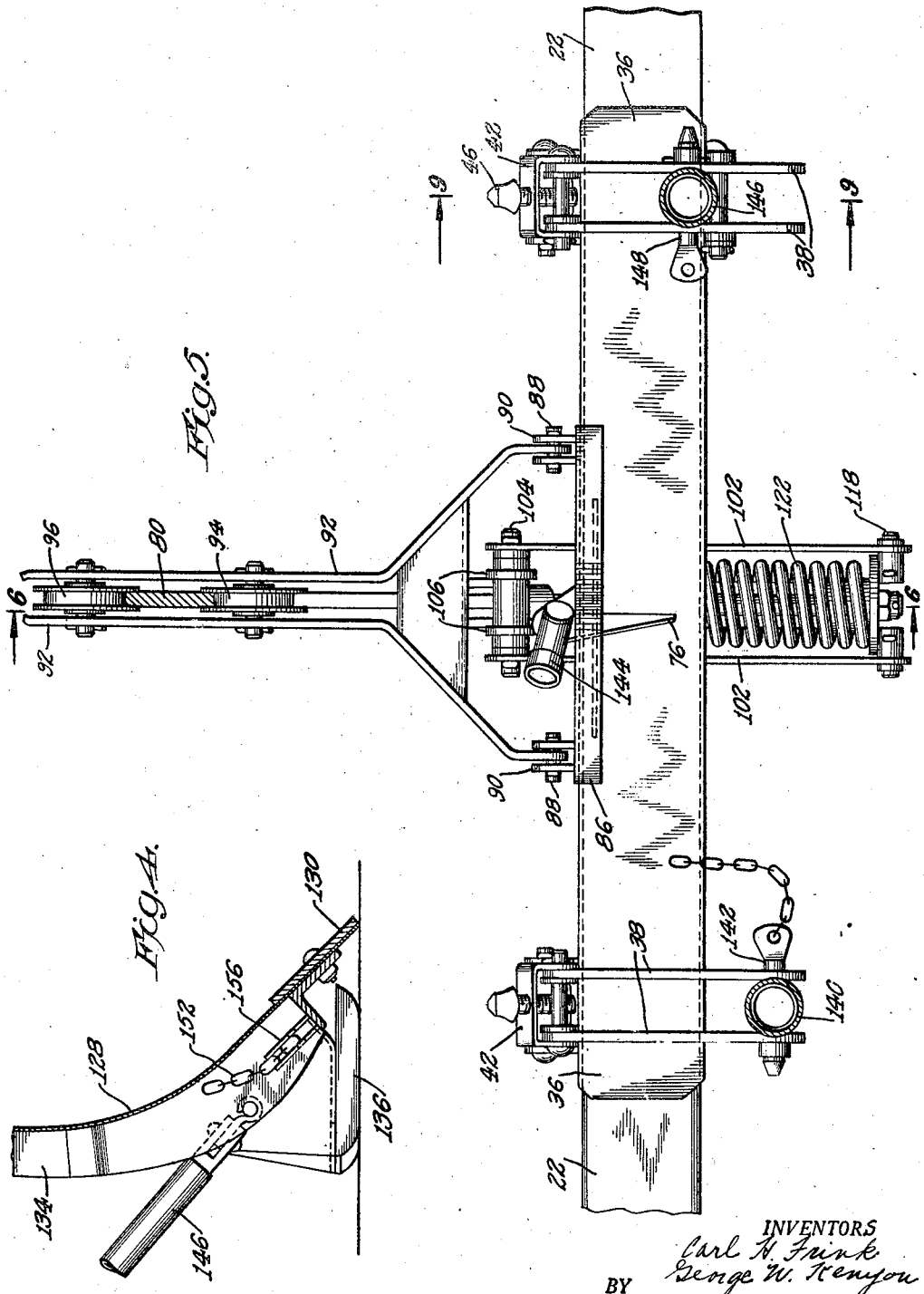

Nov. 4, 1947. C. H. FRINK ET AL 2,430,221
SNOW PLOW
Filed Dec. 1, 1943 5 Sheets-Sheet 4

INVENTORS
Carl H. Frink
George W. Kenyon
BY
John C. Kerr
ATTORNEY

Nov. 4, 1947.                C. H. FRINK ET AL                2,430,221
                                 SNOW PLOW
                           Filed Dec. 1, 1943           5 Sheets-Sheet 5
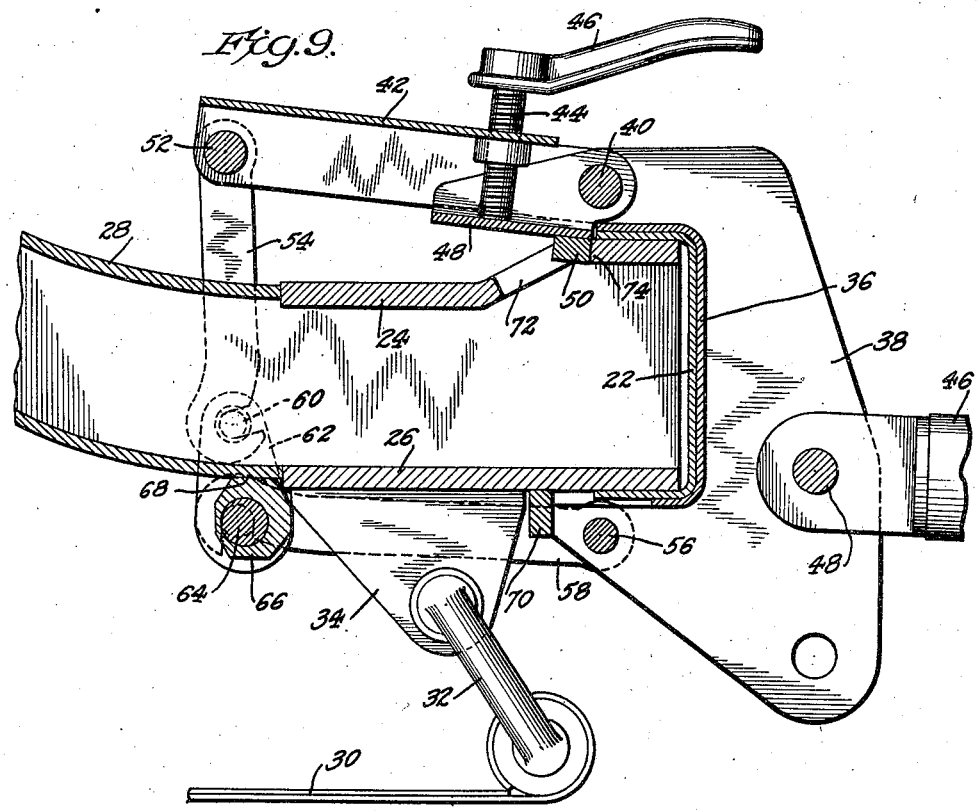
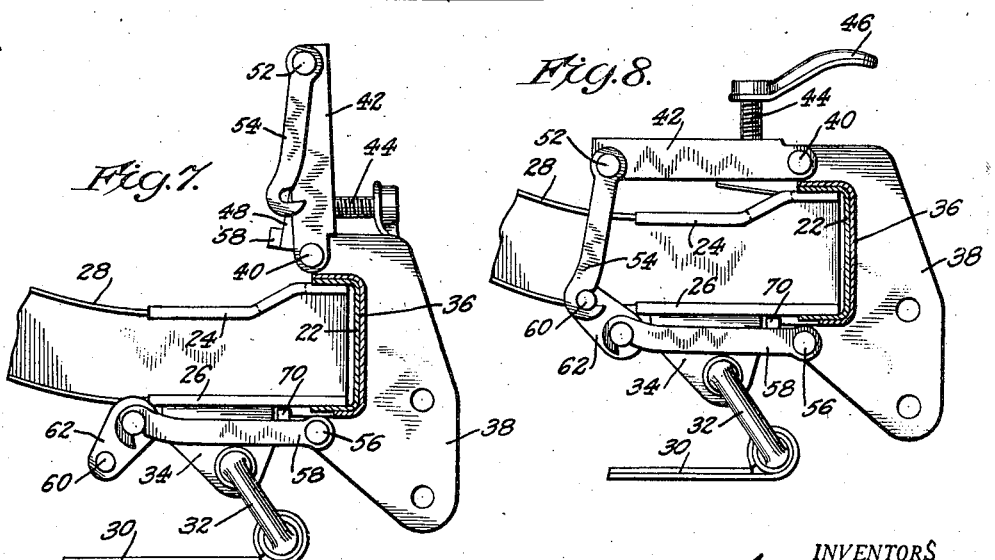
INVENTORS
Carl H. Frink
George W. Kenyon
BY John C. Kerr
ATTORNEY Patented Nov. 4, 1947

2,430,221

UNITED STATES PATENT OFFICE 2,430,221

SNOWPLOW

Carl H. Frink and George W. Kenyon, Clayton, N. Y., assignors, by direct and mesne assignments, to Frink Sno-Plows, Inc., Clayton, N. Y., a corporation of New York Application December 1, 1943, Serial No. 512,460

5 Claims. (Cl. 37—42)

This invention pertains to a snow plow particularly adapted for use in combination with a motor vehicle such as the small four-wheel drive Army truck, commonly known as the "Jeep."

An object of the invention is to provide a plow mechanism readily attachable to the truck and readily removable without the use of tools.

Another object is to provide operating devices so designed as to reduce the amount of energy required from the operator for controlling the plow in service.

Another object is to so design the plow and its drive bars that when the plow is detached from the truck the drive bars may be folded against the mold board of the plow in order to conserve storage space.

Further and other objects and advantages will be apparent from the specification and claims and from the accompanying drawings which illustrate what is now considered to be a preferred embodiment of the invention.

In the drawings:

Fig. 2 is an enlarged view of the plow and front of the truck, taken from above;

Fig. 3 is a view on line 3—3 of Fig. 2;

Fig. 4 is a view on line 4—4 of Fig. 2;

Fig. 5 is a view on line 5—5 of Fig. 2;

Figs. 7 and 8 show intermediate steps of the clamping operation which is shown completed in Fig. 9; and Fig. 9 is a detailed view on line 9—9 of Fig. 5.

Figure 1:
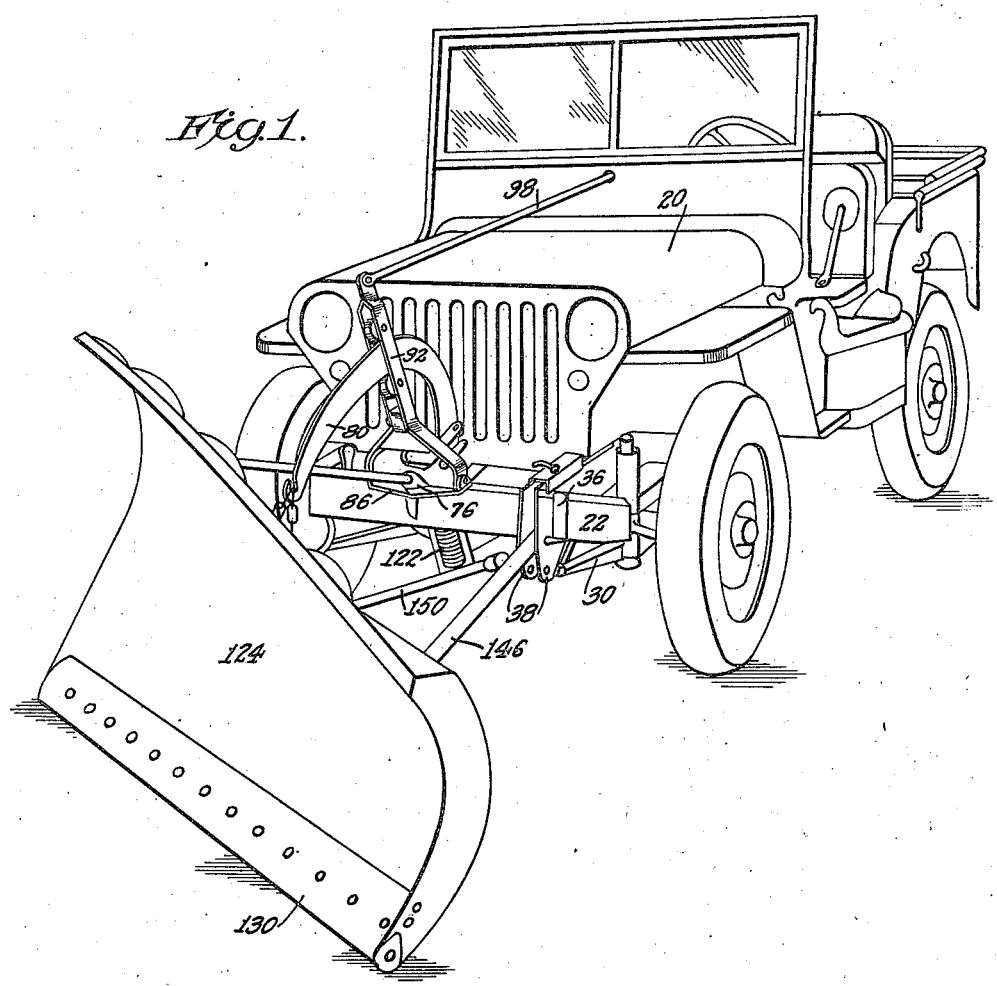
Figure 1 is a view of the plow attached to the truck.

The truck 20 has a front bumper in the form of a steel channel 22 supported on upper and lower brackets 24, 26, welded to the forwardly extending ends of frame members 28. Front springs 30 are connected by shackles 32 to hangers 34 which are attached to lower brackets 26.

The entire snow plow mechanism is supported on bumper 22 by means of a push frame in the form of a channel 36 so formed as to closely engage bumper 22. Welded to channel 36 in alignment with frame members 28 are two fittings each comprising a pair of steel plates 38. These fittings are used for clamping channel 36 to bumper 22 and also for attachment of the push rods of the plow.

The method of clamping channel 36 to the bumper will be readily understood from Figs. 2, 5, 7, 8 and 9. Channel 36 is placed in position as in Fig. 7 with brackets 38 aligned with upper and lower frame brackets 24, 26. Hinged on the top of each fitting 38, by a pin 40, is a saddle 42 provided with a screw 44 having a handle 46. Also hinged on pin 40, within saddle 42, is a latch member 48 (Fig. 9) having an abutment 50. The lower end of screw 44 rests on latch 48.

Depending from the free end of saddle 42, on pins 52, are two hooked links 54, one on each side of frame members 28. Also hinged to brackets 38, are horizontal hooked links 58, one on each side of the hangers 34.

With the above structure in mind the steps of placing the push frame in operative position will be understood from Figs. 7, 8 and 9.

In Fig. 8, links 54 have been hooked onto pins 60 on the free ends of arms 62, and links 58 have been hooked onto pins 64 (Fig. 9) formed in an eccentric rod 66 extending cross-wise under each frame member 28. On each eccentric 66 is an octagonal spacer block 68, bored eccentrically and adapted to be rotated by hand to accommodate slight variations in depth of frame members 28.

A bar 70, welded to the rear lower extension of plates 38, extends across under each frame bracket 26.

After the parts are linked together as in Fig. 8, screws 44 are tightened with the result that abutments 50 operating in openings 72 in brackets 24, engage the front ends of 24 at 74, while octagons 68 and bars 70 are clamped against the lower surfaces of members 28 and hangers 34, respectively.

It will be understood that in actual practice the dimensions of the channel 36 may conveniently provide some vertical clearance between its horizontal webs or flanges and the corresponding parts of the bumper channel 22, so as to facilitate installation of the assembly by directly sliding and rocking it into place, i. e. simply with movements toward or away from the bumper. Even if there is a close fit, however, of the push frame channel 36 over the bumper channel 22, the push frame can be easily removed (after the parts 44, 42 and 54 have been restored to the position of Fig. 7 and after the octagon 68 has been unhooked and the link 58 dropped), by first sliding the channel 36 a short distance lengthwise of the bumper 22 (in either direction) until the bars 70 are respectively clear of the truck frame brackets 26. Then the channel 36 may be backed off, first by direct pull and then by rocking it (clockwise as seen in Fig. 9) until its upper, inner edge comes down over the front face of the bumper—the bars 70 having been temporarily hooked up (if necessary) behind the lower, inner edge of the bumper until the channel reaches the position last described. Installation of the push frame can similarly be effected by reversing this sequence of operations when necessary, i. e. if for any reason there is insufficient clearance for more directly hanging the frame in place.

At the middle of push frame channel 36 is welded an anchor plate 76 projecting above the channel and set at a proper angle to accommodate the ends of one of the plow push rods.

Figure 6:
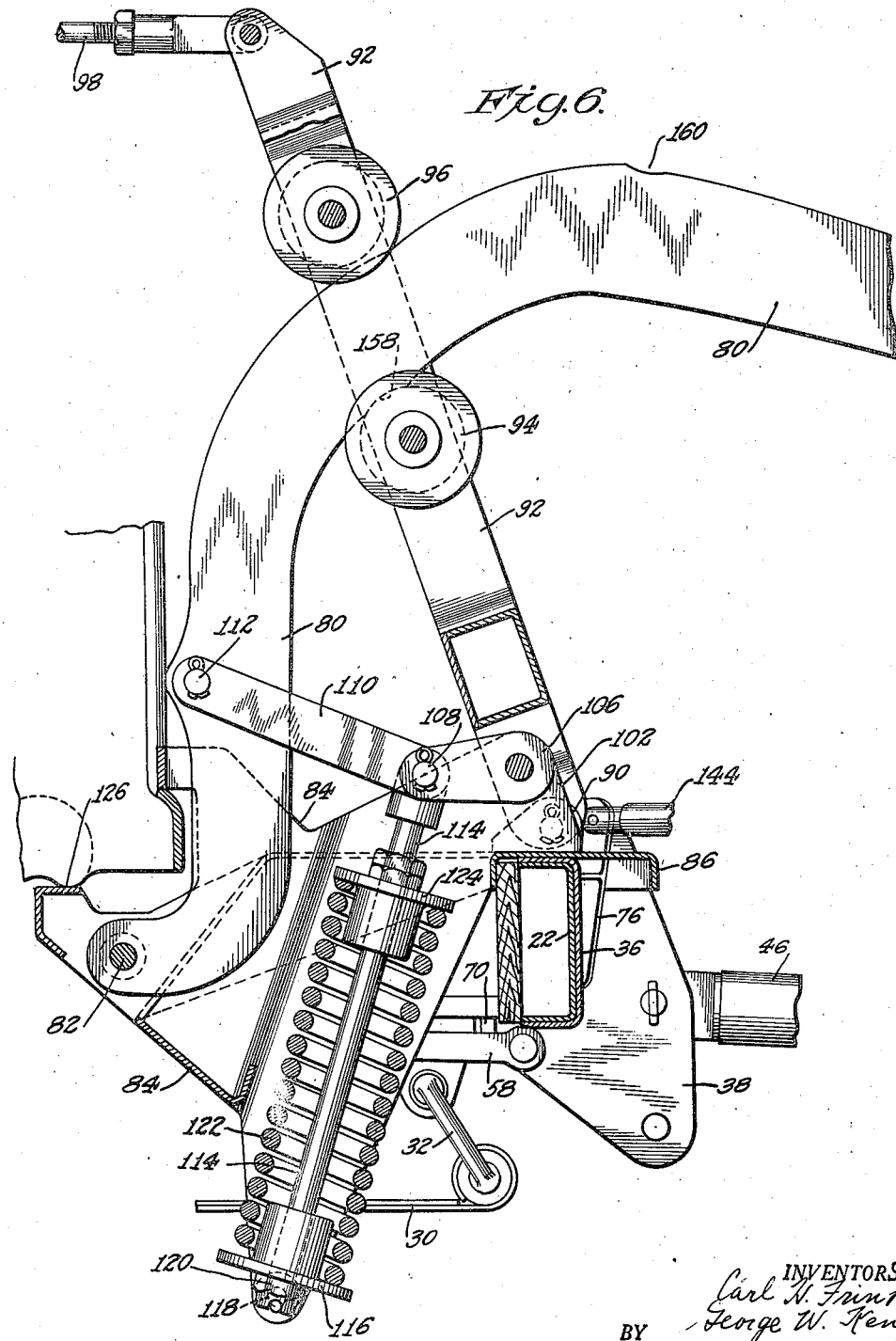
Fig. 6 is a view on line 6—6 of Fig. 5.

The next step in the assembly of the apparatus is to install the lifting device, which comprises a curved, forwardly extending, cam-like arm 80 pivotally supported on pin 82 mounted in a box-like rearwardly-extending steel frame 84 (Fig. 6). The front part of the frame is in the form of a channel 86 resting on top of the push frame 36 described above, and which is provided with a slot through which the anchor plate 76 projects. Pivotally supported on pins 88 in ears 90 on channel 86 is an upwardly extending frame-like arm 92 provided with flanged rollers 94, 96 adapted to engage the lower and upper surfaces, respectively, or lift arm 80 (Figs. 5 and 6). The upper end of arm 92 has a pull-push rod 98 under control of the driver of the truck by means of handle 100 (Figs. 2, 6).

The forward end of box frame 84 is in the form of two vertical plates 102 welded to channel 86. A horizontal pin 104 through plates 102 supports the front end of a link which is in the form of two short arms 106, the free ends of which are joined by hinge pin 108 to the forward end of a bifurcated link 110 attached at its rear end by pin 112 to lift arm 80.

Connected to pin 108 is the upper end of spring rod 114, the lower end of which is slidable through a washer 116 pivotally connected by trunnions 118 to the bottom of downwardly extending arms 120 of box frame 84. A spring 122 is compressed a predetermined amount between washer 116 and adjustable washer 124. The function of the spring is to aid the operator in the operation of the plow, as will be explained.

The rear end of frame 84 abuts a stationary part of the truck as at 126, and since the pressure is always upward at that point and always downward through channel 86, which forms the front end of the frame, it is not necessary to bolt the lifting mechanism in place.

The snow plow proper comprises essentially a mold board 124 provided with a cutting edge 130, the mold board having reinforcing ribs on its rear as at 132 (Figs. 2 and 3) and as at 134 (Figs. 2 and 4). Suitably placed ground shoes are provided as at 136 (Figs. 2 and 4). The reinforcing ribs on the mold board are bifurcated as at 138 (Fig. 3) to receive the forward end of push rod 140, the rear end of which is connected by pin 142 to the right hand (in the direction of travel) fitting 38 as indicated in Fig. 5. Push rod 144 which is adjustable in length is attached to rib 132 near the top of the mold board in Fig. 3 and extends diagonally rearwardly to be attached to anchor plate 76 (Figs. 2, 3, 5 and 6).

Push rod 146 extends from the bottom of the mold board (Figs. 2 and 4) to be attached as at 148 to the left hand (in direction of travel) fitting 38 (Fig. 5). A diagonal rod 150 connects the rear end of rod 146 to the forward end of rod 140 (Fig. 2). A lifting chain 152 extends from a bracket 154 (Fig. 3) through a slot in the free end of lift arm 80 (Figs. 1 and 2) to a bracket 156 (Fig. 4).

It will be noted that the push rods are so pivoted as to be foldable against the back of the mold board when they are detached from the vehicle. This is important because of the great saving in space when the apparatus is shipped by train, truck or airplane. In fact, if shipped along with trucks, each plow apparatus can be stored underneath a truck, thus requiring no additional shipping space for the plow, per se.

The mold board is provided with a landside as at 158 (Fig. 2), and other usual fittings, some of which are not shown.

As mentioned above, spring 122 serves to aid the operator in the operation of the plow (mold board and its attachments). The lifting device is so designed as to limit the energy input required from the operator to approximately half that required to lift the plow. For that purpose spring 122 is used as a counterbalance to provide approximately half the energy required for lifting. The spring is further compressed or loaded before attaching the plow to the lifting device by depressing and latching lift arm 80. With the plow lowered, the spring is compressed, and with the plow raised the spring is relieved. The power input (operator effort) and load are practically constant, the surfaces of cam-arm 80, and the design of the spring linkage being such as to distribute the variable energy of the spring in order to assist the operator to the best advantage. If the operator wishes to raise the plow to its inoperative position he pulls back arm 92, by means of rod 98 and handle 100, until roller 94 enters recess 158 formed on the underside of arm 80. The recess serves as an impositive lock to engage roller 94 and hold arm 80 and the plow in their elevated positions. When arm 92 is pushed forward, roller 94 is forced out of notch 158 and the plow lowers itself to operative position with its shoes 136 resting on the road. In order to provide slack in lift chain 152 so that the shoes may follow the contour of an uneven road surface, the operator may push arm 92 forward until roller 96 enters recess 160 on the top of arm 80 (Fig. 6), thus impositively locking arm 80 in a position low enough to provide slack in the chains.

When using the plow on an even surface, such as an improved highway, airport runway, etc., the nose lift chain may be adjusted so that the plow is held slightly above the ground and the weight of the snow on the mold board provides ballast to depress the front springs of the truck sufficiently to bring the cutting edge and plow shoes down into contact with the ground surface, thereby ballasting the front end of the truck and providing better traction for the front drive wheels. This raising of the plow reduces the pressure per square inch between the ground shoes and the ground surface, therefore making the plow push and steer more easily.

It is to be understood that the invention is not limited to the specific embodiment herein illustrated and described, but may be used in other ways without departure from its spirit as defined by the following claims.

What is claimed is:

1. In a snow plow for an automobile having projecting side frames and a bumper bar attached directly to said side frames, said plow comprising a channel fitting over the bumper, bars rigid with the channel and engaging under the side frames, locking shoulders rigid with the side frames, pivoted latches supported on the channel and cooperating with said shoulders to hold the channel on the bumper, locking screws for holding the latches in engagement with said shoulders, and means actuated by said screws for clamping the aforesaid bars against the undersides of the frames.

2. A snow plow for use with an automobile having forwardly extending side frames and a bumper bar secured against the ends of said frames, said plow comprising a channel fitting over the bumper bar, push arms connected to said channel in alignment with the side frames, a plurality of upper and lower projections extending laterally from and near the ends of the side frames, members supported by the channel engaging said upper and lower projections on the frames to hold the channel on the bumper bar, manually operable screws, and means controlled by said screws for securing said members in engagement with said projections.

3. In a snow plow for an automobile having forwardly extending side frames and a bumper bar attached to the side frames, a channel fitting over the bumper bar, push arms connected to said channel in alignment with the side frames, locking lugs on the side frames, pivoted latches cooperating with said lugs to hold the channel on the bumper, bars rigid with said channel and extending crosswise under the side frames, manually operable set screws for holding the latches against disengagement from their lugs, members cooperating with the undersides of the frames manually adjustable to accommodate variations in the depth of the frame members, and means actuated by the set screws for holding the manually adjustable members and the aforesaid bars in engagement with the undersides of the side frames.

4. In a snow plow for use on an automobile having forwardly projecting side frames, brackets welded on the side frames and a bumper held by said brackets against the ends of the side frames, the combination of a channel fitting over the bumper, plow push rods connected to the channel in alignment with the side frames, means carried by the channel extending above and below and cooperating with the side frames and the brackets thereon to retain the channel in position on the bumper, said means comprising hand screws operable to hold said means in channel retaining relationship, and a link between the upper and lower means for transmitting operations of the hand screws from the upper to the lower means.

5. A snow plow assembly for use with an automobile having forwardly projecting side frames and a bumper secured against the ends of said frames, said assembly comprising a channel fitting over the bumper, upper and lower brackets welded on the sides of the frames, fittings welded on the channel and extending in alignment with the side frames, push arms pivoted to said fittings, bars carried by said fittings and engaged under said side frames and the lower brackets thereon, latches pivoted on said fittings manually engageable with the upper brackets on the side frames, saddles pivoted on said fittings, manually operable screws mounted in said saddles having their ends engaging the latches, links connected to the free ends of the saddle and extending around the rear ends of the brackets and connected to the fittings, operation of the screws securing the latches against unintended displacement and actuating the saddle to tighten the links to hold the aforesaid bars in engagement with the side frames and lower brackets.

CARL H. FRINK.
GEORGE W. KENYON.

REFERENCES CITED

The following references are of record in the file of this patent:

UNITED STATES PATENTS

| Number | Name | Date |
|---|---|---|
| 1,367,607 | Krieg | Feb. 8, 1921 |
| 1,703,088 | Abbe | Feb. 26, 1929 |
| 2,141,558 | Richter | Dec. 27, 1938 |
| 2,191,323 | Richter | Feb. 20, 1940 |
| 2,234,645 | Hetzelt | Mar. 11, 1941 |
| 2,333,361 | Churchill | Nov. 2, 1943 |